Patented Aug. 16, 1949

2,479,522

UNITED STATES PATENT OFFICE 2,479,522

MALEIC ANHYDRIDE RESINOUS COPOLYMER

Franklin Strain, Barberton, Ohio, assignor to Pittsburgh Plate Glass Company, Allegheny County, Pa., a corporation of Pennsylvania No Drawing. Application March 25, 1944, Serial No. 528,161

4 Claims. (Cl. 260—78.5)

The present invention relates to synthetic resins and more particularly to resinous compositions derived by the copolymerization of polyesters, which contain a plurality of polymerizable groups, with maleic anhydride.

One object of the invention is to provide new resinous materials which possess improved physical characteristics making them particularly suitable for commercial application.

Other objects and advantages of the invention will be readily apparent from the following detailed description of certain preferred embodiments thereof.

The field of synthetic resins is today being explored by countless groups of investigators in the search for products which can be substituted for more critical materials. Research has made available many compounds forming not only satisfactory substitutes for old materials but in some instances providing better products than were heretofore available.

Among the synthetic resins evidencing pronounced value for industrial usage are the polyesters, that is, those compounds having two or more ester linkages, which contain in addition a plurality of polymerizable groups. It has been established that certain polyesters of this classification may be polymerized to form hard, insoluble, infusible resinous materials. Of particular interest are the polyesters which have two or more terminal groups derived from allyl alcohol.

The polyesters employed in the various embodiments of my invention are relatively complex and accordingly, in some instances, resist attempts at designation by the usual systems of nomenclature. Where this difficulty is encountered, the compounds are identified by reference to their acidic and alcoholic components, although it is not necessary that they be prepared by direct esterification methods.

The most simple polyesters coming within the scope of my invention are those derived from allyl alcohol and a polycarboxylic acid. Diallyl oxalate, diallyl malonate, diallyl succinate, diallyl phthalate, diallyl diglycolate and triallyl citrate are representative examples of this group of polyesters.

A second series of polyesters results from the reaction of allyl alcohol with a di-acidic intermediate, which consists of a dihydroxy compound esterified with a dibasic acid. For example, glycol bis (acid phthalate) reacts with allyl alcohol to form glycol bis (allyl phthalate). The glycol bis (allyl carbonic acid esters), identified by the structural formula:

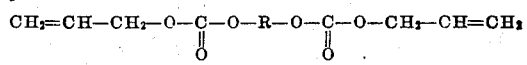

wherein R is a glycol radical, also fall within this second series. The diacidic intermediates,

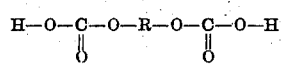

are not known to exist per se, and the compounds cannot be prepared by direct esterification. Ordinarily, the chloroformate of either allyl alcohol or the selected glycol is formed, by reaction therewith of phosgene, and the chloroformate is reacted with the other hydroxy compound to form the polyester.

A third group of polyesters can also be considered as the reaction product of allyl alcohol and a dicarboxylic acid. Graphically, these esters may be represented by the formula:

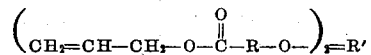

wherein R is an aliphatic radical and R' is the nucleus of a dibasic acid or a partial ester of a dihydroxy compound and a dibasic acid having two free acid groups.

Again, in this instance, the dicarboxylic acid nuclei are not known but are synthesized by coupling two hydroxy substituted aliphatic monocarboxylic acid molecules through their hydroxy groups by means of a dibasic acid, such as carbonic acid, or a partial ester of a dihydroxy compound and a dibasic acid which partial ester has two free acid groups capable of esterifying the hydroxy groups of the hydroxy substituted acids. Bis (alpha-carballyloxyethyl) carbonate is regarded as one of the first esters within this category. Ethylene glycol bis (alpha-carballyloxyethylcarbonic acid ester) is an example of a more complex ester of this group.

A fourth group of polyesters is also of considerable importance as the source of a copolymerizing material within the purview of my invention. Although these esters might also be considered as formed by the reaction of allyl alcohol and a dicarboxylic acid, the nature of the nucleus of the ester is so complex that, for purposes of clarity, it requires definition through its components. The symmetrical polyesters of this group are composed of two N-substituted allyl carbamates, united through the N-substituent groups by a dibasic acid. One ester of this class which has been investigated has been given the formula:

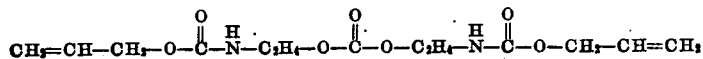

and is named bis (2-carballyloxyaminoethyl) carbonate.

Dibasic acids, other than carbonic acid, may be substituted in the ester nucleus, if it is desired, and other alkyl groups may replace the ethyl groups forming the N-substituent of the carbamic acid.

It is also possible to prepare unsymmetrical polyesters in this fourth group wherein an N-substituted allyl carbamate is united to allyl alcohol by a dibasic acid. A typical unsymmetrical ester is 2-carballyloxyaminoethyl allyl carbonate having the probable structural formula:

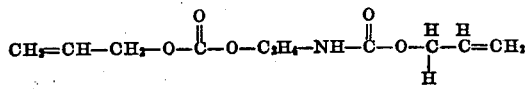

Here again dibasic acids other than carbonic acid may be used to connect the N-substituted allyl carbamate and allyl alcohol and other alkylene groups may replace the ethylene group forming the N-substituent of the allyl carbamate.

The polyesters or polyester amides, as they might be termed, are generally synthesized by the reaction of allyl chloroformate with an aminoalkanol, such for example, as ethanolamine, in the preparation of 2-carballyloxyaminoethyl allyl carbonate. The active chlorine of the allyl chloroformate combines not only with the hydroxyl group of the aminoalkanol to form a carbonate ester linkage but also with one H atom of the amino group to yield (an amide) linkage. In the preparation of the symmetrical polyester amides, the allyl hydroxyalkyl carbamate is first prepared by ammonolysis of diallyl carbonate with an aminoalkanol and thereafter is reacted with phosgene.

The four classes of polyesters hereinbefore described are analogous in that each contains compounds having

terminal groups. The active, unsaturated portions, the polymerizable $CH_2=CH-CH_2-$ groups, are separated by at least two and in general not more than eight ester linkages, that is a linkage through an oxygen atom which is attached to a carbonyl group. All of the polyesters will polymerize under proper conditions to form hard, insoluble, infusible resins, which are substantially transparent and colorless. It has been found, however, that the physical properties of these polymeric materials can be improved by copolymerization of the monomeric ester with maleic anhydride.

The amount of maleic anhydride which is admixed with the monomeric ester can be varied within relatively wide limits. Other conditions being equal, as the percentage of maleic anhydride is increased toward an upper limit of 45 percent, the hardness, flexural strength, impact strength and ultimate compressive strength in the resulting copolymer are progressively increased.

For example, a copolymer consisting of 95% of diethylene glycol bis (allyl carbonate) and 5% of maleic anhydride is harder and stronger than polymerized diethylene glycol bis (allyl carbonate). Similarly the copolymerization of 10% of maleic anhydride with the polyester yields an even harder and stronger resin. Further increases in the percentage of maleic anhydride in the copolymer composition result in even stronger products. It has been observed that maleic anhydride is in general compatible with all of the monomeric polyesters hereinbefore described and accordingly no difficulty is experienced in preparing the mixtures which are subjected to polymerization. In addition, the maleic anhydride has a thinning action when added to certain of the polyesters, which are normally viscous in their pure state. This action facilitates mixing of the materials and insures uniformity of the final polymeric compositions.

The new copolymers are particularly useful when prepared by cast polymerization for they provide clear, transparent sheets suitable for wide application. They may also be employed as the bonding and impregnating agent for laminated paper or textiles, used in the production of structural elements and various other molded objects.

The following examples are illustrative of my invention:

Example I

To a mixture consisting of 80% by weight of diallyl phthalate and 20% by weight of maleic anhydride was added 3% by weight of benzoyl peroxide as a polymerization catalyst. Other organic peroxides or percarbonates well known to the art will serve equally as well as benzoyl peroxide. The combined ingredients were introduced into a plate mold and subjected to a temperature of 50° C. for 6 hours, which was followed by heating at 70° C. for 36 hours. At the end of this period polymerization was substantially complete and there was produced a clear, transparent resin sheet. A test section, cut from the resin sheet, was subjected to standard tests as developed and approved by the American Society for Testing Materials. The following table shows the results of these tests and compares the physical properties of the copolymer with those of the polyester polymerized alone under like conditions.

|  | Ester | Copolymer |
| --- | --- | --- |
| Hardness (Knoop) | 27.5 | 30.0 |
| Flexural strength, p. s. i | 10,300 | 18,200 |
| Compression ultimate, p. s. i | 22,600 | 23,000 |
| Impact Strength unnotched Izod | 0.85 | 1.4 |

Example II

A cast sheet was made in a manner similar to that described in Example I, using 80 parts by weight of ethylene glycol bis (allyl carbonic acid ester) and 20 parts by weight of maleic anhydride conjointly polymerized. The improvements in the physical properties of the polyester resulting from the copolymerization therewith of maleic anhydride are illustrated in the follwing table:

|  | Ester | Copolymer |
| --- | --- | --- |
| Hardness (Knoop) | 23.0 | 30.6 |
| Flexural Strength, p. s. i | 12,000 | 12,500 |
| Compression ultimate, p. s. i | 27,000 | 30,300 |
| Impact strength unnotched Izod | 1.0 | 3.1 |

Example III

A series of cast sheets was made, as in Example I, using diethylene glycol bis (allyl carbonic acid ester) and varying proportions of maleic anhydride copolymerized therewith. The physical properties of the several copolymers and their relation to the properties of the ester polymerized alone are given in the following table:

|  | Ester | Copolymers with maleic anhydride content as indicated based on the total weight of the components | | | | | |
|---|---|---|---|---|---|---|---|
|  |  | 5% | 10% | 15% | 20% | 25% | 41% |
| Hardness (Knoop) | 16 | 20.8 | 23.1 | 23.1 | 25.3 | 24.4 | 24.9 |
| Flexural Strength, p. s. i | 9,500 | 10,200 | 11,900 | 13,400 | 18,000 | 18,000 | 20,300 |
| Compression ultimate, p. s. i | 22,100 | 23,600 | 24,900 | 26,300 | 26,700 | 27,800 | 28,800 |
| Impact Strength unnotched Izod | 2.1 | 2.4 | 2.9 | 2.9 | 4.0 | 3.5 | 5.9 |

Example IV

Using similar technique, a cast sheet of bis (alpha - carballyloxyethyl) carbonate admixed with 20% by weight of maleic anhydride was prepared. Again the physical properties of the copolymer produced were materially better than those of the ester polymerized alone, as shown in the following table:

|  | Ester | Copolymer |
|---|---|---|
| Hardness (Knoop) | 26.5 | 30.6 |
| Flexural Strength, p. s. i | 13,200 | 19,100 |
| Compression ultimate, p. s. i | 23,000 | 24,800 |
| Impact Strength Unnotched Izod | 1.2 | 2.8 |

Example V

A copolymer of 80% of ethylene glycol bis (alpha-carballyloxyethyl carbonic acid ester) and 20% by weight of maleic anhydride was prepared, as in the preceding examples, and its physical properties compared with the ester polymerized alone. The results are tabulated as follows:

|  | Ester | Colopymer |
|---|---|---|
| Hardness (Knoop) | 22.8 | 29.3 |
| Flexural Strength, p. s. i | 18,500 | 22,300 |
| Compression Ultimate, p. s. i | 26,900 | 28,500 |
| Impact Strength Unnotched Izod | 2.36 | 4.7 |

Example VI

A copolymer of 80% of 2-carballyloxyaminoethyl allyl carbonate and 20% by weight of maleic anhydride was prepared, as in the preceding examples, and its physical properties compared with the ester polymerized alone. The results are tabulated as follows:

|  | Ester | Copolymer |
|---|---|---|
| Hardness (Knoop) | 27.4 | 32.6 |
| Flexural Strength, p. s. i | 14,800 | 18,500 |
| Compression Ultimate, p. s. i | 25,700 | 29,400 |
| Impact Strength Unnotched Izod | 1.78 | 2.4 |

Example VII

A copolymer of bis (2-carballyloxyaminoethyl) carbonate and 20% by weight of maleic anhydride was prepared, as in the preceding examples, and its physical properties compared with the ester polymerized alone. The results are tabulated as follows:

|  | Ester | Copolymer |
|---|---|---|
| Hardness (Knoop) | 30.6 | 34.5 |
| Flexural Strength, p. s. i | 25,900 | 30,700 |
| Compression Ultimate, p. s. i | 25,600 | 31,500 |
| Impact Strength Unnotched Izod | 3.68 | 4.4 |

The foregoing experiments demonstrate conclusively the beneficial results obtained by the copolymerization of maleic anhydride with a polyester having at least two terminal groups derived from allyl alcohol. As hereinbefore mentioned, the maleic anhydride may form a small or a considerable proportion of the copolymer composition. It has been observed, however, that optimum benefits are obtained over the entire range of physical properties when approximately 20% by weight of maleic anhydride is employed. It will, of course, be understood that other percentage compositions are contemplated.

Obviously, other modifications and variations in the processes and compositions described herein may be made without departing from the spirit of my invention or the scope of the appended claims.

What I claim is:

1. A resinous composition of matter consisting of a copolymer of maleic anhydride and a neutral polymerizable polycarboxylic ester selected from the group consisting of diallyl oxalate, diallyl malonate, diallyl succinate, diallyl phthalate, diallyl diglycolate, triallyl citrate, glycol bis (allyl phthalate), bis (alpha-carballyloxyethyl) carbonate, ethylene glycol bis (alpha-carballyloxyethyl carbonic acid ester), ethylene glycol bis (allyl carbonic acid ester), diethylene glycol bis (allyl carbonic acid ester), bis (2-carballyloxyaminoethyl) carbonate, and 2-carballyloxyaminoethyl allyl carbonate, said maleic anhydride component being present in an amount ranging from 5 to 45 percent by weight of the mixture of maleic anhydride and neutral polymerizable ester.

2. A resinous composition of matter consisting of a copolymer of maleic anhydride and diallyl phthalate, said maleic anhydride component being present in an amount ranging from 5 to 45 percent by weight of the mixture of maleic anhydride and diallyl phthalate.

3. A resinous composition of matter consisting of a copolymer of maleic anhydride and diethylene glycol bis (allyl carbonic acid ester), said maleic anhydride component being present in an amount ranging from 5 to 45 percent by weight of the mixture of maleic anhydride and diethylene glycol bis (allyl carbonic acid ester).

4. A resinous composition of matter consisting of a copolymer of maleic anhydride and bis (2-carballyloxyaminoethyl) carbonate, said maleic anhydride component being present in an amount ranging from 5 to 45 percent by weight of the mixture of maleic anhydride and bis (2-carballyloxyaminoethyl) carbonate.

FRANKLIN STRAIN.

(References on following page)

REFERENCES CITED

The following references are of record in the file of this patent:

UNITED STATES PATENTS

| Number | Name | Date |
|---|---|---|
| 2,280,256 | Patterson | Apr. 21, 1942 |
| 2,394,592 | Chenicek | June 25, 1942 |
| 2,340,110 | D'Alelio | Jan. 25, 1944 |
| 2,370,565 | Muskat et al. | Feb. 27, 1945 |
| 2,373,067 | Thomas et al. | Apr. 3, 1945 |
| 2,375,256 | Soday | May 8, 1945 |
| 2,378,629 | Hanford | June 19, 1945 |
| 2,384,123 | Muskat et al. | Sept. 4, 1945 |
| 2,397,631 | Strain | Apr. 2, 1946 |